Sept. 20, 1971 H. F. OTT 3,606,124
INTERMITTENT MOVEMENT
Filed Feb. 2, 1970 2 Sheets-Sheet 1

HOWARD F. OTT
INVENTOR.

BY
ATTORNEYS

Sept. 20, 1971　　　　　　　H. F. OTT　　　　　　　3,606,124
INTERMITTENT MOVEMENT
Filed Feb. 2, 1970　　　　　　　　　　　　　　　　2 Sheets-Sheet 2
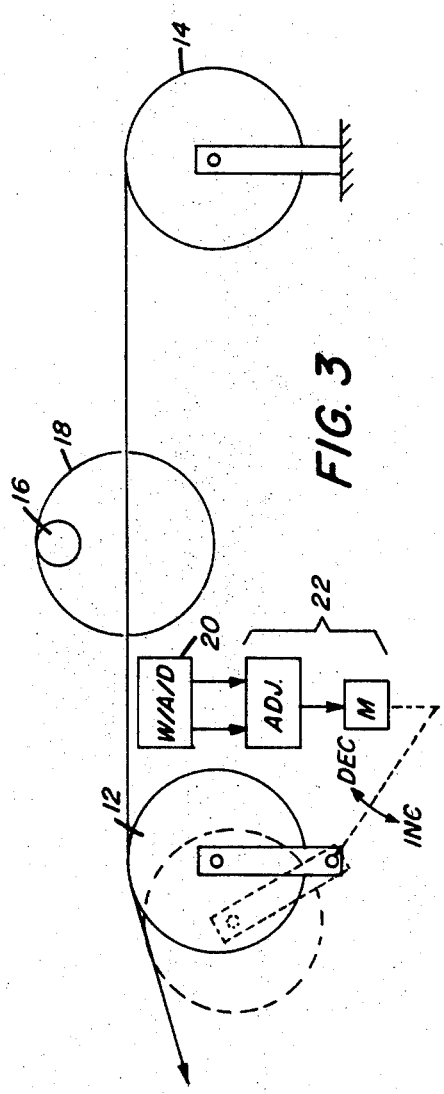
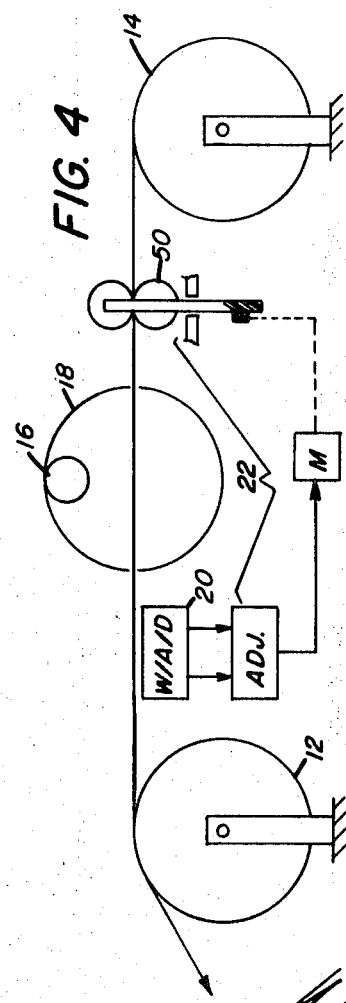
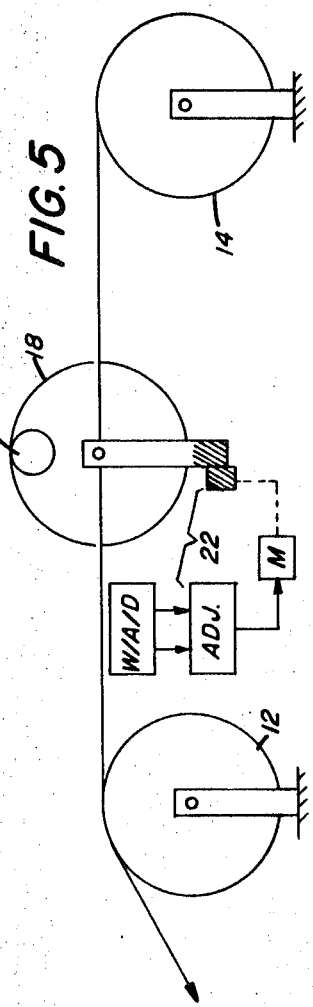
HOWARD F. OTT
INVENTOR.
BY
ATTORNEYS

United States Patent Office 3,606,124
Patented Sept. 20, 1971

3,606,124
INTERMITTENT MOVEMENT
Howard F. Ott, Victor, N.Y., assignor to Eastman
Kodak Company, Rochester, N.Y.
Filed Feb. 2, 1970, Ser. No. 7,878
Int. Cl. B65h *17/02*
U.S. Cl. 226—113                                          6 Claims

ABSTRACT OF THE DISCLOSURE

Control is obtained for the prior art practice of intermittently moving a continuously driven web by cyclically stroking such web so as to pull it by discrete amounts from a releasable supply thereof. Regulation of intermittent web advance is disclosed as being controlled in accordance with the length of web subject to such cyclical stroking.

BACKGROUND OF THE INVENTION

(1) Field of the invention

Figure 1:
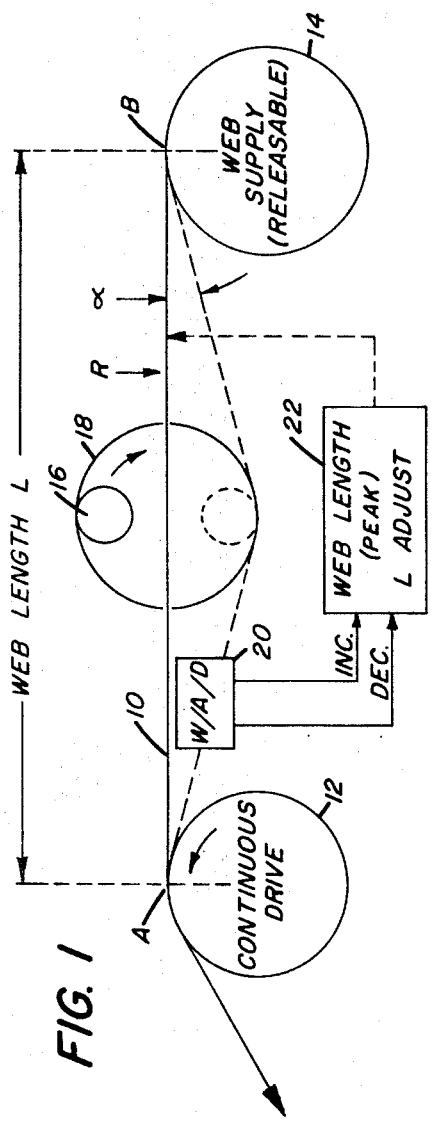

The present invention relates in general to intermittent movements, and to controls therefor. As presently contemplated, the invention provides an improved movement for intermittently stepping webs, such as motion picture film, say, through a movie projector or through a motion picture printing apparatus.

(2) Description relative to the prior art

The invention provides an improvement to the kind of intermittent movement indicated in U.S. Pat. 3,408,144; and to emphasize the teaching of the invention, the invention is cast—at least in one embodiment—in the environment of the apparatus of U.S. Pat. 3,408,144; Motion picture film may be advanced intermittently past a shutter mechanism by continuously taking up on such film while simultaneously cyclically stroking (tugging) against such film between spaced apart points of film suspension, e.g. between the film take-up and a releasable supply thereof. In the apparatus of U.S. Pat. 3,408,144, film is advanced a precise amount by such a technique; and then such film is drawn back (vacuum pull) for engagement with a registration tooth or pin. A shutter mechanism is timed to actuate while the film is in engagement with the registration tooth. If the film is advanced too much, it may (undesirably) be in pull-back motion during the time that the shutter mechanism is actuated; and if the film is advanced too little, there will be no frame-to-frame engagement of film and tooth. With present day films, the movement of U.S. Pat. 3,408,144 will usually work quite efficiently for its intended purpose; but with older films, the movements of U.S. Pat. 3,408,144 may leave something to be desired, i.e. film may be in pull-back motion during shutter actuation, or film may not advance on a frame-to-frame basis. Analysis of this problem has indicated that whereas present day films have better length stability, older films are subject to shrinkage. A shrunken film means too short a length of film—for stroking purposes—between the aforesaid spaced apart suspension points, and attendantly, intermittent film advance will be greater than desired. On the other hand, modern films shrink little, and in some environments, e.g. high relative humidity, films may actually be longer than at the time of perforation. Too long a length of film—for stroking purposes—between the aforesaid spaced apart suspension points, means that film advance will not be enough for the desired intermittent movement.

SUMMARY OF THE INVENTION

Having recognized the source of a problem inherent in the operation of an intermittent movement of the above-described type, the persent invention, in light of such recognition, proposes the control of such intermittent movement by regulating the (maximum) amount of web that obtains between a releasable supply of such web and the said continuous web drive. That such regulation will work to control the amount of intermittent web advance will become apparent later.

Objects of the invention: To provide a better intermittent movement; and especially to provide an improved way to regulate the intermittent advance of a web which is continuously fed across spaced apart suspension points, and cyclically moved therebetween.

Figure 2:
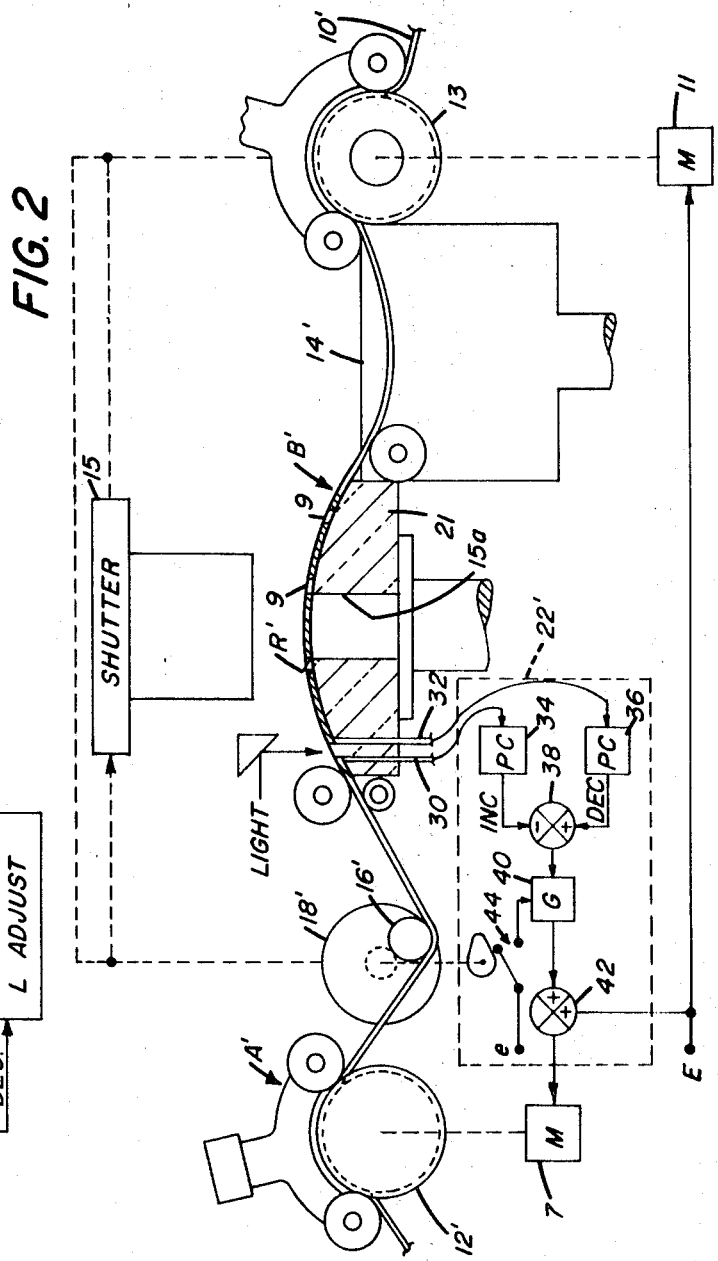

The invention will be described with reference to the figures, wherein:

FIG. 1 is a schematic diagram useful for illustrating the teaching of the invention, FIG. 2 is a view, like that indicated in U.S. Pat. 3,408,144, and particularly indicates a control arrangement for practicing the invention, and FIGS. 3–5 are schematic views illustrating various ways to implement the present invention.

The concept(s) of the invention may be appreciated from FIG. 1: A length of web 10 is suspended between spaced apart points A, B. The web, at A, is continuously fed along by a drive 12; and the web 10 is drawn from a releasable supply thereof 14. An extended roller 16 on a rotary stroking mechanism 18 cyclically beats against the web 10, causing it to advance intermittently past a reference point R. The amount of intermittent film advance is, as indicated by the invention, dependent on the (maximum, or peak) length of web that obtains between points A and B. That this should be so may be appreciated by assuming that the web length L is, first, extremely long; and then by assuming that such length L is extremely short. In the former assumption, it will be appreciated that web beating will merely cause the web to flag; whereas in the latter assumption, the web will move an amount approximating the radial dimension of the rotary beater 18. Putting this another way, intermittent web advance is dependent upon the web deflection angle α.

The present invention proposes to regulate intermittent web advance by controllably increasing and decreasing the (maximum) amount of web that obtains between the points A, B: A web advance detector 20 detects whether the intermittent movement of web past the point R is too much, or too little. If the amount of advance is too much (i.e. too short a length of web for stroking purposes), a web length adjuster 22, cooperative with the advance detector 20, effects lengthening of the web between points A, B; and if the amount of web advance is too little (i.e. too long a length of web for stroking purposes), the web length adjuster 22 effects shortening of the web between the points A, B.

FIG. 2 indicates apparatus of the type described in U.S. Pat. 3,408,144; and the character notations of FIG. 1 are used in connection with corresponding elements of FIG. 2, but such character notations are primed in FIG.

2. A length of perforated (9) web 10' is fed continuously, by means of a motor (11) driven sprocket 13 into a (web) tension-producing vacuum chamber 14', which serves as a releasable web supply. A continuously driven sprocket 12' takes up on the web 10'; and a stroking mechanism 18', driven by the motor 11, causes its roller 16' to stroke periodically the web 10'. Such periodic stroking of the web 10' by the mechanism 18' causes the web to accelerate intermittently over a support gate 21, and past a shutter mechanism 15 and aperture 15a. In so accelerating, the web 10' moves periodically up and over a registration tooth R' on the web support gate 21; after which the web 10' is withdrawn (vacuum chamber 14') so that its perforations 9 periodically successively engage the tooth R'. The shutter mechanism 15, which is driven by the motor 11 (for timing purposes) actuates to "look at" the web 10' on a frame-to-frame basis.

Slight web shrinkage, say of old film, or stretch of new film, while having no effect on the sprocket-feeding of the web 10', puts respectively slightly too short, or too long, a length of web between the points A', B' of FIG. 2; and attendantly, the action of the stroking mechanism 18' causes the intermittent web advance to be respectively greater, or less, than desired, therefore causing the web to be either (1) in motion, back to the registration tooth R', at the moment the shutter 15 actuates, or (2) unable to ride up and over the registration tooth R'. To overcome such problem(s), the invention provides a control circuit of the kind indicated generally within the dashed lines 22':

A pair of optical fibers 30, 32, mounted within the web support 21, are adapted to be illuminated via the web apertures 9. The fiber 30 operates to excite a photocell circuit 34; and the fiber 32 operates to excite a photocell circuit 36. The respective outputs of the photocell circuits 34, 36 are applied to an algebraic subtraction circuit 38, and thence through a gate circuit 40 to an algebraic summation circuit 42. The gate circuit 40 is periodically opened (cam and switch assembly 44) in timed relationship with the operation of the beater mechanism 18, say, at the peak of the intermittent web advance. Thus if, at the instant the gate circuit 40 opens, the fiber 30 is illuminated (too short a web length, causing too much intermittent advance), a negative signal is applied to the algebraic summation circuit 42; if, however, at such instant the fiber 32 is illuminated, a positive signal is applied to the summation circuit 42. The summation circuit 42 also has applied thereto a signal E, which drives both the sprocket (13) motor 11, and a motor 7 for driving the sprocket 12'. Absent an output signal from the gate circuit 40—evidencing that the intermittent web advance is as desired—the motors 7, 11 drive their respective sprockets 12', 13' at the same rate. When, however, the gate circuit 40 output signal is negative (i.e. the web length must increase because there has been too much web advance) the signal applied to the motor 7 becomes less than that applied to the motor 11 and, attendantly, the sprocket 12' slows down in relationship to the sprocket 13' to increase the web length A', B' (between the continuously driven sprocket 12' and the releasable web supply in the vacuum chamber 14') which is being beaten; a gate circuit 40 output signal which is positive (evidencing that the web advance has been too little) effectively increases the signal applied to the motor 7, thereby causing the motor 7 to run faster than the motor 11 to decrease the aforesaid web length A', B' which is being stroked.

No attempt has been made above to indicate circuit particulars, since these are well within the skill of those in the art. The functions of the various control elements of FIG. 2 may be performed by various other control elements—e.g. a mechanical differential drive for the sprocket 12' in place of the indicated electrical differential therefor, or a pneumatic web advance sensor in place of the indicated optical fibers, etc.

As noted above, the intermittent advance of a web is regulated by adjusting the (maximum) length of web that obtains between a continuous drive for such web and a releasable web supply.

FIGS. 3–5 indicate various other ways to practice web advance regulation according to the invention; FIG. 3 indicates that the web supply 14 and continuous drive 12 may be re-positioned with respect to each other; FIG. 4 indicates that rollers 50 may be positioned to adjust web length as required; and FIG. 5 indicates that, while the quiescent length of web between the supply 14 and continuous drive 12 is invariant, the "maximum" amount of web that obtains between such elements may be varied by re-positioning the beater mechanism 18'.

The invention has been described in detail with particular reference to preferred embodiments thereof, but it will be understood that variations and modifications can be effected within the spirit and scope of the invention.

What is claimed is:

1. In a movement for use in intermittently advancing a web, which movement is of the type having:
   (1) drive means for continuously drawing a web from a releasable supply thereof that is spaced apart from said drive means, and
   (2) means for cyclically stroking a part of said web that extends from said supply to said drive means, the improvement comprising:
      (a) means for producing a control signal dependent on the amount of discrete intermittent web advance that obtains past a reference, and
      (b) means responsive to said control signal for adjusting the maximum length of web that may obtain between said supply and said drive means.

2. The apparatus of claim 1 including means for continuously replenishing web drawn from said supply, and wherein said means responsive to said control signal is adapted to regulate the relative speeds of said drive means and said replenishing means.

3. The apparatus of claim 1 including means for relatively positioning the said drive means and the said web supply, and wherein the said means responsive to said control signal is adapted to cooperate with said positioning means to adjust the distance between the said drive means and the said web supply.

4. The apparatus of claim 1 including means, disposed between said drive means and the said web supply, adapted to contact substantially continuously the said web, and being further adapted for positioning in response to the said control signal.

5. The apparatus of claim 1 including means responsive to said control signal for positioning said beater means generally perpendicular to the plane of said web.

6. In a web advancing means for intermittently driving a perforated web, which includes:
   (1) first means for advancing said web from a source of supply;
   (2) second means for advancing said web to a receiving means; and
   (3) an intermittent advancing means between said first and second means and comprising:
      (a) means for resiliently urging the formation of a loop of said web after it leaves said first means;
      (b) support gate means having a surface across which said web is adapted to be moved, said support gate means having an aperture therein;
      (c) register means adjacent said aperture, positioned to engage a perforation of said web and limit movement of said web toward said first advancing means, said register means being located as to index a frame on said web with respect to said aperture; and (d) movable roller means adapted to engage said web and cyclically pull said web past said support gate means toward said second means, the improvement comprising:
  (1) means for producing a control signal dependent on the amount of discrete intermittent web advance that obtains past said aperture, and
  (2) means responsive to said control signal for adjusting the maximum length of web that obtains between said first means and said second means.

References Cited

UNITED STATES PATENTS 3,408,144  10/1968  Cowan _____ 355—48

ALLEN N. KNOWLES, Primary Examiner

G. A. CHURCH, Assistant Examiner

U.S. Cl. X.R.

226—117, 139